3,836,466
SOLID LUBRICANT

Wataru Abe, Chigasaki, and Akio Muto and Yasuyuki Terada, Fujisawa, Japan, assignors to Oiles Kogyo Kabushiki Kaisha, Tokyo, Japan
Continuation-in-part of abandoned application Ser. No. 43,477, June 4, 1970. This application June 15, 1973, Ser. No. 370,419
Int. Cl. C10m 7/02, 7/04, 7/06
U.S. Cl. 252—12                                  7 Claims

ABSTRACT OF THE DISCLOSURE

This invention relates to a solid lubricant suitable for use at the high temperature of 400–500° C. manufactured by adding a predetermined amount of sodium fluoride to either graphite or a mixture of graphite and tungsten disulfide.

Figure 1:
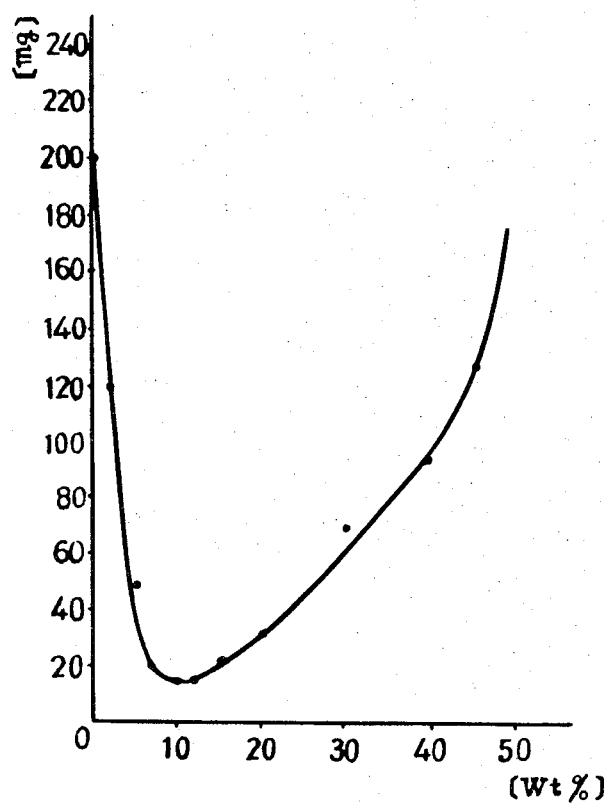

The addition of the predetermined amount of sodium fluoride is effective for protecting oxidation of the solid lubricant and increasing the life of a film formed on a sliding surface.

---

This is a continuation-in-part of our prior application Ser. No. 43,477, filed June 4, 1970, now abandoned.

This invention relates to a solid lubricant formed of a predetermined amount of sodium fluoride and graphite or a mixture of sodium fluoride, graphite and tungsten disulfide and especially to a solid lubricant suitable for a use at a high temperature.

Ordinarily, graphite and molybdenum disulfide are widely used as a solid lubricant. Especially graphite may be used at a high temperature, but it tends to increase its coefficient of friction at a certain temperature range, for example, up to about 400° C. and in the course of raising the temperature of the lubricant from a room temperature to the use temperature. Also it lacks both film forming ability on the sliding surface and durability of the film in the solid lubricating state.

Although molybdenum disulfide is superior in its film forming ability on a bearing surface and a mating surface thereof, and in the migration of lubricant to the opposite mating surface thereof, it tends to lack lubricating properties owing to accompanying considerable oxidation when the temperature of use of the lubricant is more than 350° C.

It is important to have properties by which the solid lubricant, especially that used at high temperature, forms a stable solid lubricating film along the sliding surfaces of the bearing, which film bears repeated friction for a long period to avoid direct contact between the mating materials.

However, solid lubricants need to have the property of a low coefficient of friction in view of saving of electric power and of the element(s) connected with the bearing. Especially, the new solid lubricants of the invention, when used at high temperatures, should have a coefficient of friction equal to or less than that of ordinary, or well known solid lubricants.

In order to solve said problem, many attempts were made for manufacturing a self-lubricating solid lubricant suitable for use at the high temperature.

It has been proposed to manufacture solid lubricants by dispersing barium fluoride-calcium fluoride eutectic throughout a porous nickel-chromium alloy as disclosed in U.S. Pat. No. 3,419,363 and by hot-pressing and sintering a mixture of particulate calcium fluoride and powdered nickel alloy as disclosed in U.S. Pat. No. 3,297,571 and also by compounding a mixture of amorphous carbon and graphite with an additive which is a fluoride of barium, calcium, cerium, magnesium or strontium as disclosed in British Patent No. 973,131. However, it has been found from our experiment that the said lubricant containing the additive as mentioned above does not give any satisfactory wear resistance to the bearing and is not migrated to the opposite mating surface thereby making it difficult to form the film of lubricant on the sliding surface. Therefore, a solid lubricant usable at a high temperature of 400–500° C. has not been found.

As the result of many researches for obtaining the solid lubricant suitable for the use of high temperature range, it has been found by us to manufacture the solid lubricant effective for protecting oxidation of the solid lubricant and increasing the life of film formed on the sliding surface by adding the predetermined amount of sodium fluoride to either graphite or a mixture of graphite and tungsten disulfide with or without sodium meta-phosphate as the binder.

Although the metal fluorides of groups I and II of the Periodic Table of elements such as LiF, $CaF_2$, $BaF_2$ etc. other than NaF have been used in manufacturing the solid lubricant, the solid lubricant having the characteristic feature of this invention as mentioned above has not been manufactured by a joint use of said fluorides of groups I and II other than NaF and graphite or the mixture of graphite and $WS_2$.

The object of this invention resides in manufacturing the solid lubricant having a superior film forming ability and a considerable high lubricating ability suitable for the use in the temperature range from room temperature to 500° C.

Graphite to be used is a scaly natured graphite from Ceylon districts having an ash content less than 1 wt. percent and Mohs hardness of 1–2.

Sodium fluoride to be used has more than 95 wt. percent purity.

Sodium meta-phosphate having a chemical reagent grade is used in the lubricant as the binder of each component therein.

As to the particle size of each component to be compounded, graphite powder having a relatively large particle size is preferable to use in view of increasing the heat resistance of the solid lubricant but is not preferable to use in view of changing the lubricant to increase the ash content.

Accordingly, graphite powder having a particle size less than 150 mesh is suitable to use to obtain a satisfactory result.

Sodium fluoride having as fine particle size as possible is preferable to use in viewpoint of improving the quality of the solid lubricant but the use of sodium fluoride powder having a relatively large particle size tends to bring a bad influence to the lubricating ability. Therefore sodium fluoride powder having a particle size less than 200 mesh (Tyler) is suitable to obtain a satisfactory result.

Two sorts of tungsten disulfide having the mean particle sizes of 2 microns and 0.2 micron respectively are on the market but, it is preferable to use tungsten disulfide having the mean particle size of 2 microns from the viewpoint of increasing the heat resistance of the solid lubricant as shown in the case of graphite.

Some examples practicing the present invention will be described as follows:

The preparation of the solid lubricant of this invention is as follows:

(1) The solid lubricant suitable for embedding into the bearing is manufactured by uniformly compounding sodium fluoride fine powders having a particle size less than 200 mesh (Tyler) to the flake-like graphite powders having a particle size less than 150 mesh (Tyler) and then pressing the compounded materials in a metallic mold under a pressure of about 1,000 kg./cm.²

(2) The solid lubricant suitable for embedding into the bearing is manufactured by uniformly compounding tungsten disulfide fine powders having the mean particle size of 2 microns and sodium fluoride fine powders having a particle size less than 200 mesh (particles will pass through 200 Tyler mesh) to the flake-like graphite powders having a particle size less than 150 mesh and then pressing in the metallic mold under a pressure of about 1,000 kg./cm.$^2$.

(3) The lubricant in the paste state suitable for a surface coating is manufactured by uniformly compounding sodium fluoride fine powders having a particle size less than 200 mesh to the flake-like graphite having a particle size less than 150 mesh and then kneading the compounded materials with an aqueous solution of sodium meta-phosphate used as a binder.

(4) The lubricant in the paste state suitable for the surface coating is manufacturing by uniformly compounding tungsten disulfide fine powders having the mean particle size of 2 microns and sodium fluoride fine powders having a particle size less than 200 mesh to the flake-like graphite powders having a particle size less than 150 mesh and then kneading the compounded materials with an aqueous solution of sodium meta-phosphate used as the binder.

(5) The solid lubricant having high strength is manufactured by removing most of the water contained in the paste manufactured according to the methods of items 3 and 4, molding the materials obtained in a metallic mold under the pressure of about 1,000 kg./cm.$^2$, and drying the molded material in a hot air blast stove at the temperature of about 200° C.

In the example, compositions of components namely graphite, tungsten disulfide and sodium contained in the lubrican were shown as follows:

TABLE 1

| Number of material | Component (wt. percent) | | |
|---|---|---|---|
| | Graphite | WS$_2$ | NaF |
| 1 | 99 | 0 | 1 |
| 2 | 97 | 0 | 3 |
| 3 | 95 | 0 | 5 |
| 4 | 93 | 0 | 7 |
| 5 | 90 | 0 | 10 |
| 6 | 88 | 0 | 12 |
| 7 | 85 | 0 | 15 |
| 8 | 80 | 0 | 20 |
| 9 | 75 | 0 | 25 |
| 10 | 70 | 0 | 30 |
| 11 | 65 | 0 | 35 |
| 12 | 60 | 0 | 40 |
| 13 | 55 | 0 | 45 |
| 14 | 50 | 0 | 50 |
| 15 | 89 | 1 | 10 |
| 16 | 85 | 5 | 10 |
| 17 | 80 | 10 | 10 |
| 18 | 75 | 15 | 10 |
| 19 | 70 | 20 | 10 |
| 20 | 65 | 25 | 10 |
| 21 | 60 | 30 | 10 |
| 22 | 50 | 40 | 10 |

In the Table 1, the samples 1–14 were manufactured according to method of item (1) and the samples 15–22 were manufactured according to the method of item (2).

The samples 1–22 were tested to measure the interrelationship between a degree of wearing the bearing material lubricated with the lubricant as well as the migrating amount of the lubricant to the opposite mating surface thereof and the amount of sodium fluoride compounded in lubricant.

The test condition for measuring an amount of wearing lubricant and a migrating amount of lubricant were shown as follows:

The ten test pieces taking the dimension of 4 mm. diameters x 5 mm. heights containing various amounts of sodium fluoride were embedded into ten holes provided on a sliding surface of the cylindrical thrust bearing of bronze castings (BC6) having dimensions of 16 mm. in inside diameter x 28 mm. in outside diameter x 15 mm. in height (cf. ASTM B30, Alloy 4A).

The propotion of the total surface area of test pieces to the total sliding surface area of said thrust bearing material corresponds to 30%.

A cylindrical slider composed of hte material S45C having the same dimensions as said bearing material runs on the test pieces embedded in said bearing material for 20 hrs. at the temperature of 500° C., the sliding speed of 3.5 m./min. and the surface pressure of 30 kg./cm.$^2$.

After sliding, the amount (mg.) of the wearing loss of the bearing material was measured, while a weight increasement of S45C (ASTM 1045 Steel) was measured as the migrating amount of the solid lubricant.

Figure 2:
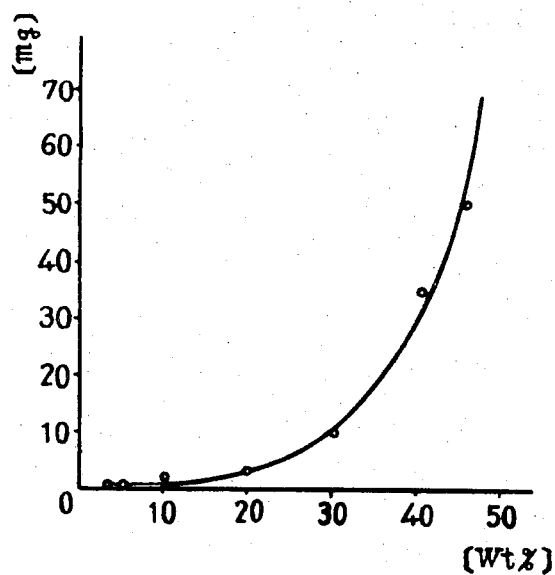

The test results were shown in the Tables 2 and 3 and the FIGS. 1 and 2. Table 2 and FIG. 1 showed the interrelationship between a degree of wearing the lubricant and the amount of sodium fluoride compounded in the lubricant.

TABLE 2

| Amount of NaF compounded, weight percent | 0 | 2 | 5 | 7 | 10 | 12 | 15 | 20 | 30 | 40 | 45 | 50 |
|---|---|---|---|---|---|---|---|---|---|---|---|---|
| Amount of wearing the lubricant (mg.) | 200 | 120 | 50 | 20 | 14 | 15 | 23 | 32 | 69 | 96 | 128 | >200 |

Table 3 and FIG. 2 showed the interrelationship between the migrating amount of the lubricant to the slider and the amount of sodium fluoride compounded in the lubricant.

TABLE 3

| Amount of NaF compounded, wt. percent | 3 | 5 | 10 | 20 | 30 | 40 | 45 | 50 |
|---|---|---|---|---|---|---|---|---|
| Migrating amount of the lubricant (mg.) | 1 | 1 | 3 | 4 | 10 | 34 | 50 | >150 |

Figure 3:
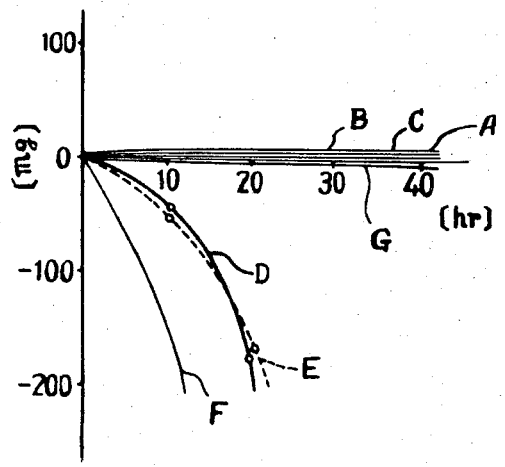

Table 4 and FIG. 3 showed the interrelationship between the migrating amount of the lubricant to the slider and the testing time.

TABLE 4

| Weight change of the slider (mg.) | Testing time (hrs.) | | | |
|---|---|---|---|---|
| | 5 | 10 | 20 | 30 40 |
| Solid lubricant of this invention: | | | | |
| A | | +3 | +3 | +4 +4 |
| B | | +6 | +8 | +9 +10 |
| C | | +4 | +5 | +5 +5 |
| Control: | | | | |
| D | −15 | −40 | −180 | |
| E | −20 | −43 | −178 | |
| F | −70 | −140 | | |
| G | | | −5 | −5 −10 |

TABLE 5

[Table 5 showing the interrelationship between the abrasion amount on the bearing (mm.) and the friction time (hrs.).]

| Abrasion amount of bearing (mg.) | Testing time (hrs.) | | |
|---|---|---|---|
| | 10 | 20 | 40 |
| Solid lubricant of this invention, No. 12 (in Table 1) | 0.025 | 0.075 | 0.250 |
| Control: | | | |
| F | 0.175 | 0.350 | |
| G | 0.125 | 0.250 | |

The test was effected under the following conditions:
The test pieces and the cylindrical slider were same to those in the test of Tables 1 and 2.

The test was effected for 40 hrs. at the temperature of 300° C., at the sliding speed of 3.5 m./min. and the surface pressure (load) of 50 kg./cm.$^2$.

The same A is the sample No. 5 of the Table 1; B is that of the sample No. 18; C is the sample coated with the film of the solid lubricant of the sample No. 18 compounding 8 wt. percent of sodium meta-phosphate as the binder on the sliding surface of the sample B; D is graphite; E is graphite adding 10 wt. percent of tungsten disulfide; F is graphite adding 40 wt. percent of LiF; G is graphite adding 40 wt. percent of CaF$_2$.

The Comparative test relative to the heat resistance of the solid lubricant of this invention in comparison with each component thereof has been accomplished under the following test conditions.

The test piece of 10 mg. was slowly heated from room temperature (20° C.) to 500° C. by raising the temperature at a rate of 4° C. per minute in the stream of air having a flow rate of 15 cc. per minute and measured the weight change on the basis of mg. by means of the tension heat balance.

The test result was shown in Table 6 and FIG. 3.

TABLE 6

| | Bearing material (wt. percent) at— | | | | |
|---|---|---|---|---|---|
| | 100 °C. | 200 °C. | 300 °C. | 400 °C. | 500 °C. |
| Components: | | | | | |
| Graphite | 0 | 0 | 0 | 0 | 0 |
| $WS_2$ | 0 | 0 | 1.7 | 2.3 | 5.0 |
| Solid lubricant of this invention: | | | | | |
| Graphite 90–NaF 10 | 0 | 0 | 0 | 0 | 0 |
| Graphite 75–$WS_2$ 15–NaF 10 | 0 | 0 | 0 | 0 | 0 |
| (Graphite 75–$WS_2$ 15–NaF 10) 92–$NaPO_3$ 8 | 0 | 0.5 | 1.0 | 1.5 | 1.5 |

From the test results, it has been confirmed that there is not a considerable weight loss even if the sample is maintained in a measuring temperature for a long period in view of that the weight of the sample reaches to almost constant at the temperature above 100° C. by the weight loss of 3 mmg.

It has been found that although sodium fluoride to be used possess Mohs' hardness more than 5, sodium fluoride itself does not indicate any lubricating property. It results in avoiding a change of the coefficient of friction depending on a change of temperature as well as improving the film forming ability when 1% by weight of sodium fluoride is added to graphite and results in increasing the duration of the film coated on the lubricant in the dry friction when about 3% by weight of sodium fluoride are added to graphite and also in showing the maximum effect relative to the duration of the film coated on the lubricant when about 10 wt. percent of sodium fluoride are added to graphite.

The more the proportion of sodium fluoride in the lubricant increases, the more the amount of migrating the lubricant to the slider increases.

If the proportion of sodium fluoride in the lubricant is more than 50 wt. percent, the amount of the migration to the slider increases resulting in a bad influence on the lubricating properties.

Therefore, it has been found to be preferable to compound sodium fluoride less than 45 wt. percent to the lubricant to obtain a satisfactory result, and to be obtained a similar result to that of graphite-tungsten disulfide lubricant.

Although tungsten disulfide itself indicates superior lubricating properties, it lacks heat resistance in comparison with that of graphite.

Since the addition of sodium fluoride to the lubricant is effective to the improvement of the heat-resistance, it makes use in the temperature range of 400–500° C. or more possible.

The effect of adding tungsten disulfide to graphite results in an increase of the lubricating properties in addition to the improvement of the film forming ability on the surface of the lubricant at a relative low temperature.

It is preferable to use less than 30 wt. percent tungsten disulfide but in the application of relative low temperature, tungsten disulfide may be used in the lubricant in he upper side of said range.

As the use temperature of the lubricant raises, the amount of tungsten disulfide added to the lubricant may decrease for the reason that in a high temperature, especially 400–500° C., the duration of the film formed on the lubricant, rather than a low frictionability thereof, is considered to be important and the addition of tungsten disulfide contributes to the depression of the coefficient of friction. But it brings a lack of durability of the film formed on the lubricant.

Accordingly for high temperature uses, the lubricant not containing tungsten disulfide is often used.

Sodium meta-phosphate is used as a binder of each component of the lubricant but sodium meta-phosphate itself does not possess the lubricating property, so that it is not preferable to compound it in the lubricant too much but to compound 5–10 wt. percent of sodium phosphate in the lubricant in case of the film forming use and to compound less than 20 wt. percent of sodium meta-phosphate in the lubricant in case of the block form use.

It is possible to use for various applications by varying the amount of the binder to be compounded in the lubricant.

Table 3 and FIG. 2 showed the change of migrating the amount of the solid lubricant to the slider using the same test conditions as those in Table 2 and FIG. 1.

It has been found that the migration considerably increases in case that 50 wt. percent of sodium fluoride is compounded in the lubricant resulting in a depression of the lubricating ability but the change of the coefficient of friction permits maintaining the coefficient of friction to about 0.2 in case of up to 45 wt. percent of sodium fluoride, and the coefficient of friction reaches to 0.4 in case of more than 50 wt. percent of sodium fluoride.

From the test results of the Samples A, B and C in Table 4 and FIG. 3, it has been found that satisfactory migration of the solid lubricant to the slider is effected over the testing periods and the weight of the slider increases.

It has been observed that the film formed on the surface of the slider by migration of the lubricant presents a smooth film and glossy black color appearance.

The coefficient of friction of the samples A and B showed 0.15–0.20 after 20 hrs. from the beginning of the test, 0.20–0.25 after 40 hrs., while the coefficient of friction of the sample C showed 0.08–0.10 after 20 hrs.

In the case of the sample C it has been observed to exhibit good run-in behavior and to migrate the lubricant uniformly to the slider to form a smooth film thereon and to indicate the similar coefficient of friction as those of the samples A and B after the lapse of 40 hrs. On the contrary in case of the samples D and E, it has been observed not to migrate the lubricant to the slider to form the smooth film thereon whereby many scars are formed on the friction surface of the bearing material and weight loss of the slider occurs.

In the experimental results as shown in Table 3 and FIGS. 2 and 3, when the weight of the slider increases by 50 mg. the thickness of the migration film reaches to the mean value of 4–6 microns, when increases by 10 mg. the thickness of the migration film reaches to less than 1 micron.

The modes of the application of the solid lubricant are shown as follows:

Pellets of the solid lubricant manufactured by molding powders not containing any binder under high pressure according to the methods of the Items (1) and (2) are suitable to use as the solid lubricant for embedding use.

It is suitable to use the solid lubricant of this invention in such way as making holes in a sliding surface of the bearing and embedding the soil lubricant in said holes.

In said case, a load is carried on the sliding surface of the bearing not embedding the lubricant, the lubricant embedded into the bearing is fixed in the holes of the sliding surface of the bearing.

Therefore, a deformation and a destruction of the lubricant in the pellet state owing to the load will not occur.

The lubricant in the pellet state manufactured by molding the powders containing the binder under the high pressure according to Items (3)–(5) is suitable to use for forming the film on the sliding surface of the bearing in such way that a paste manufactured according to Items (3)–(5) spreads on the sliding surface of the bearing and is heated to about 200° C. to remove the moisture from the paste.

The lubricant may be used in the form of block by either heating the paste-like lubricant to remove most of moisture contained therein, molding it in a metallic mold under pressure and then burning it in the hot blast stove of about 200° C., or by molding it by means of a hot press under heat and pressure.

Since the solid lubricant containing the binder in the block form has good mechanical strength, it may be used without providing any reinforcement surrounding the lubricant to protect it from the deformation and the destruction of the lubricant. Said lubricant in block form may be also used as the bearing body itself.

As mentioned above, the solid lubricant of this invention possesses good heat resistant, film forming ability, and durability and is applicable to various fields of use.

What is claimed is:

1. The solid lubricant characterized by comprising 55–97% of graphite and 3 up to less than 45% of sodium fluoride on the weight basis of the lubricant.
2. The solid lubricant characterized by comprising less than 30% of tungsten disulfide, 3 up to less than 45% of sodium fluoride and the balance is graphite on the weight basis of the lubricant.
3. The solid lubricant characterized by comprising 55–97 wt. percent of graphite, 3 up to less than 45 wt. percent of sodium fluoride and also 5–20% wt. percent of sodium meta-phosphate on the basis of the total weight of graphite and sodium fluoride.
4. The solid lubricant characterized by comprising less than 30 wt. percent of tungsten disulfide, 3 up to less than 45 wt. percent of sodium fluoride and the balance is graphite and also 5–20 wt. percent of sodium meta-phosphate on the weight basis of the total amount of the graphite, sodium fluoride and tungsten disulfide.
5. The solid lubricant as in Claim 1 characterized by the sodium flouride having a particle size less than 200 mesh and the graphite comprising flake-like powder having a particle size less than 150 mesh, the lubricant being effective up to temperatures of 400–500° C. or more.
6. The solid lubricant as in Claim 1 comprising about 10% wt. sodium fluoride and about 90% wt. graphite.
7. The solid lubricant as in Claim 2 comprising at least 1% wt. of tungsten disulfide having a particle size of less than 2 microns and 25 to 96% weight of graphite.

References Cited

UNITED STATES PATENTS

| | | | |
|---|---|---|---|
| 3,297,571 | 1/1967 | Bonis | 252—12 |
| 3,301,781 | 1/1967 | Rice et al. | 252—12 |
| 3,419,363 | 12/1968 | Sliney | 252—12 |
| 3,775,318 | 11/1973 | Lavik et al. | 252—12 |

DANIEL E. WYMAN, Primary Examiner

I. VAUGHN, Assistant Examiner